(12) United States Patent
Dudda et al.

(10) Patent No.: US 11,800,548 B2
(45) Date of Patent: Oct. 24, 2023

(54) INSTANT UPLINK ACCESS WITHOUT ALWAYS ON FEEDBACK

(71) Applicant: TELEFONAKTIEBOLAGET LM ERICSSON (PUBL), Stockholm (SE)

(72) Inventors: Torsten Dudda, Aachen (DE); Malik Wahaj Arshad, Upplands Vasby (SE); Reem Karaki, Aachen (DE); Gustav Wikström, Täby (SE)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 438 days.

(21) Appl. No.: 16/345,140

(22) PCT Filed: Oct. 25, 2017

(86) PCT No.: PCT/IB2017/056630
§ 371 (c)(1),
(2) Date: Apr. 25, 2019

(87) PCT Pub. No.: WO2018/078547
PCT Pub. Date: May 3, 2018

(65) Prior Publication Data
US 2019/0289618 A1    Sep. 19, 2019

Related U.S. Application Data

(60) Provisional application No. 62/412,901, filed on Oct. 26, 2016.

(51) Int. Cl.
*H04W 72/50* (2023.01)
*H04W 76/11* (2018.01)
(Continued)

(52) U.S. Cl.
CPC ........ *H04W 72/535* (2023.01); *H04L 1/1657* (2013.01); *H04L 1/189* (2013.01);
(Continued)

(58) Field of Classification Search
None
See application file for complete search history.

(56) References Cited

U.S. PATENT DOCUMENTS

| 2011/0010598 A1 | 1/2011 | Wang et al. |
| 2011/0310833 A1* | 12/2011 | Lee ..................... H04W 74/008 370/329 |

(Continued)

FOREIGN PATENT DOCUMENTS

| CN | 101499887 A | 8/2009 |
| CN | 102918793 A | 2/2013 |
| CN | 104735801 A | 6/2015 |

OTHER PUBLICATIONS

Ericsson, Non-adaptive retransmissions for SPS with skip padding and short periods, Tdoc R2-163785, 3GPP TSG-RAN WG2 #94, Nanjing, China, May 23-27, 2016.

*Primary Examiner* — Brian S Roberts

(57) ABSTRACT

According to certain embodiments, a method is disclosed for use in a wireless device. The method comprises transmitting uplink data to a network node. The uplink data is transmitted according to a semi-persistent scheduling (SPS) configuration obtained from the network node. The uplink data is transmitted without transmitting padding when no data is available for transmission. The method further comprises retransmitting the uplink data to the network node until receiving an indication to transmit new uplink data. The indication is received from the network node via a control channel.

50 Claims, 4 Drawing Sheets

(51) Int. Cl.
- *H04W 76/27* (2018.01)
- *H04L 1/1812* (2023.01)
- *H04L 1/1825* (2023.01)
- *H04L 1/1867* (2023.01)
- *H04L 5/00* (2006.01)
- *H04W 16/14* (2009.01)
- *H04L 1/1607* (2023.01)
- *H04W 72/23* (2023.01)

(52) U.S. Cl.
CPC .......... *H04L 1/1819* (2013.01); *H04L 1/1825* (2013.01); *H04L 1/1887* (2013.01); *H04L 5/0055* (2013.01); *H04L 5/0082* (2013.01); *H04W 16/14* (2013.01); *H04W 72/23* (2023.01); *H04W 76/11* (2018.02); *H04W 76/27* (2018.02)

(56) References Cited

U.S. PATENT DOCUMENTS

| | | |
|---|---|---|
| 2012/0269137 A1 | 10/2012 | Kang et al. |
| 2012/0309402 A1* | 12/2012 | Cheng .................. H04W 72/04 455/450 |
| 2014/0126499 A1 | 5/2014 | Li |
| 2014/0153531 A1 | 6/2014 | Ko |
| 2015/0043391 A1* | 2/2015 | Yin ....................... H04L 5/0092 370/280 |
| 2015/0049678 A1* | 2/2015 | Speight ............... H04W 72/042 370/329 |
| 2015/0117337 A1 | 4/2015 | Choi |
| 2015/0181571 A1 | 6/2015 | Park et al. |
| 2016/0094314 A1 | 3/2016 | Wong et al. |
| 2018/0115985 A1* | 4/2018 | Lee .................. H04W 72/1268 |
| 2018/0220440 A1* | 8/2018 | Dudda .................. H04L 1/1822 |
| 2018/0270026 A1* | 9/2018 | Lee ....................... H04L 1/1887 |

\* cited by examiner

INSTANT UPLINK ACCESS WITHOUT ALWAYS ON FEEDBACK

This application is a 371 of International Application No. PCT/IB2017/056630, filed Oct. 25, 2017, which claims the benefit of U.S. Application No. 62/412,901, filed Oct. 26, 2016, the disclosures of which are fully incorporated herein by reference.

TECHNICAL FIELD

The present disclosure relates, in general, to wireless communications and, more particularly, to instant uplink access (IUA) in a wireless network.

BACKGROUND

The embodiments disclosed herein are within the context of Long-Term Evolution (LTE), i.e. Evolved Terrestrial Radio Access Network (E-UTRAN). It should be understood that the problems and solutions described herein are equally applicable to wireless access networks and user-equipments (UEs) implementing other access technologies and standards (e.g. 5G NR). LTE is used as an example technology where the certain embodiments are suitable, and using LTE in the description therefore is particularly useful for understanding the problem and solutions solving the problem.

In LTE the resources for Uplink (UL) transmissions are granted by the Evolved Node B (eNB). This can be done dynamically, i.e. the eNB schedules the UL transmission per transmission time interval (TTI). Alternatively, this can be done using the semi persistent scheduling (SPS) framework, so that multiple TTIs are granted at the same time, i.e. prior to a data transmission. Thereby, an uplink grant is sent via Physical Downlink Control Channel (PDCCH) to the UE and addressed to the UE's semi-persistent scheduling-cell radio network temporary identifier (SPS-CRNTI). This grant is considered a configured grant so that data transmissions happen according to its e.g. resource allocation and modulation and coding scheme (MCS) in subsequent SPS occasions.

In 3GPP Rel-14, the SPS framework is enhanced under the name of 'Instant Uplink Access (IUA)' or 'Fast Uplink Access' to allow periodicities of 1 TTI, i.e. that consecutive TTIs are persistently allocated to a user. A further enhancement is that no padding transmission is mandated to the UE when no data is available for transmission. Furthermore, non-adaptive retransmissions are prioritized over new data transmissions on granted SPS-resources. The standardized UE-behavior is depicted in Table 1, for pre-Rel-14 "legacy" SPS, as well as on reception of dynamic grants, and for the Rel-14 feature "fast uplink access", which is enabled when the UE is configured to skip padding transmissions and a subframe (SF) interval of less than 10 ms for SPS. The UE action depends on the hybrid automatic repeat request (HARQ) buffer of the HARQ process of the current subframe, the reception on physical HARQ indication channel (PHICH), and whether new data for transmission is available in the UE.

TABLE I

UL transmission UE behavior in conventional IUA

| HARQ buffer of current process | PHICH reception | New data available? | → UE ACTION LEGACY SPS (and Received Dynamic grants) | → UE ACTION "skip Padding + SF interval < 10 ms = FAST UL" |
|---|---|---|---|---|
| Empty | ACK | Yes | Transmit new data | Transmit new data |
| Empty | ACK | No | Transmit padding | Do nothing |
| Empty | NACK | Yes | Transmit new data | Transmit new data |
| Empty | NACK | No | Transmit padding | Do nothing |
| Full | ACK | Yes | Transmit new data (HARQ override*) | Transmit new data (HARQ override) |
| Full | ACK | No | Transmit padding (HARQ override*) | Do nothing (keep HARQ) |
| Full | NACK | Yes | Transmit new data (HARQ override*) | Non-adaptive retransmission (prioritized) |
| Full | NACK | No | Transmit padding (HARQ override*) | Non-adaptive retransmission |

A typical use case for Fast uplink Access is to configure it on UEs with sporadic but latency critical traffic. Compared to legacy LTE operation with dynamic scheduling, the UEs can access the UL resources directly once data becomes available. Compared to legacy operation, the UEs are however not mandated to transmit padding on the granted resources, if no data is available, which saves UE energy as well as reduces interference in the system.

Operation of the Fast uplink Access solution mandates that the eNB always transmits PHICH. Otherwise, in case the UE sent a data transmission, but the eNB did not realize it and did not send PHICH, the UE would read PHICH and randomly interpret the received noise (i.e. missing transmission) as acknowledged (ACK) or not acknowledged (NACK). In case the UE falsely interprets ACK, data loss might occur, since new data would override the HARQ transmission falsely assumed as ACK. Always transmitting PHICH by the eNB is not energy efficient as well.

In an alternative known HARQ scheme, i.e. asynchronous HARQ operation, the UE would ignore PHICH transmissions. Retransmissions or new data transmissions would only be scheduled via indication on PDCCH. A grant on PDCCH with new data indicator (NDI)=toggled would indicate a new data transmission. This approach has two issues: With asynchronous HARQ, the UE assumes that all transmitted UL HARQ processes were successful (set local status to ACK). The UE performs a HARQ retransmission for a HARQ process only upon reception of a corresponding UL Grant (NDI not toggled) from the eNB. with SPS, the eNB does not know when to expect data from the UE. If an eNB missed an uplink transmission from the UE, due to low signal-to-interference-plus-noise ratio for example, it will not send any feedback, and the UE will falsely interpret that as an ACK.

In SPS, continuous grants are not sent and the configured SPS grant is always assumed as NDI toggled, leading to always new transmissions and no retransmissions. The behavior is unclear for IUA.

Besides, the concept of always-on PHICH transmissions is not applicable for time division duplex (TDD) mode or more specifically in unlicensed band where both UL and DL transmission may occupy the same frequency bands.

Therefore, there is a need to enhance the IUA operation to conserve resources and reduce unnecessary transmissions in certain circumstances.

SUMMARY

According to certain embodiments, a method is disclosed for use in a wireless device. The method comprises transmitting uplink data to a network node. The uplink data is transmitted according to a semi-persistent scheduling (SPS) configuration obtained from the network node. The uplink data is transmitted without transmitting padding when no data is available for transmission. The method further comprises retransmitting the uplink data to the network node until receiving an indication to transmit new uplink data. The indication is received from the network node via a control channel.

According to certain embodiments, a wireless device comprises storage operable to store instructions and processing circuitry operable to execute the instructions. The wireless device is operable to transmit uplink data to a network node. The uplink data is transmitted according to a semi-persistent scheduling (SPS) configuration obtained from the network node. The uplink data is transmitted without transmitting padding when no data is available for transmission. The wireless device is further operable to retransmit the uplink data to the network node until receiving an indication to transmit new uplink data. The indication is received from the network node via a control channel.

According to certain embodiments, a computer program product comprises a non-transitory computer readable medium storing computer readable program code. The computer readable program code comprises program code for transmitting uplink data to a network node. The uplink data is transmitted according to a semi-persistent scheduling (SPS) configuration obtained from the network node. The uplink data is transmitted without transmitting padding when no data is available for transmission. The computer readable program code further comprises program code for retransmitting the uplink data to the network node until receiving an indication to transmit new uplink data. The indication is received from the network node via a control channel.

The above-described method, wireless device, and/or computer program code may include various other features, including any one or more of the following:

In certain embodiments, the method/wireless device/computer program product receives the SPS configuration from the network node prior to transmitting the uplink data.

In certain embodiments, the method/wireless device/computer program product transmits the new uplink data to the network node in response to receiving the indication from the network node via the control channel.

In certain embodiments, the method/wireless device/computer program product prioritizes transmission of buffered hybrid automatic repeat request (HARQ) data as the new uplink data.

In certain embodiments, the method/wireless device/computer program product ignores indications from the network node on a Physical Hybrid-ARQ Indicator Channel (PHICH).

In certain embodiments, the indication to transmit the new uplink data comprises a grant of uplink resources received from the network node on the control channel.

In certain embodiments, the grant of uplink resources is addressed to a semi-persistent scheduling-cell radio network temporary identifier (SPS-CRNTI) associated with the wireless device.

In certain embodiments, the SPS configuration comprises a periodicity of one transmission time interval (TTI).

In certain embodiments, the method/wireless device/computer program product transmits the uplink data to the network node by transmitting the uplink data using unlicensed radio resources.

In certain embodiments, the method/wireless device/computer program product transmits the uplink data to the network node by transmitting the uplink data according to a time division duplex configuration.

In certain embodiments, the method/wireless device/computer program product receives a message from the network node indicating to fallback to a negative acknowledgement (NACK) procedure for performing retransmissions.

In certain embodiments, the NACK procedure comprises transmitting padding when no data is available for transmission.

In certain embodiments, the NACK procedure comprises monitoring a Physical Hybrid-ARQ Indicator Channel (PHICH) for NACK messages and wherein the message from the network node indicating to fallback to the NACK procedure comprises a Radio Resource Control (RRC) reconfiguration message.

In certain embodiments, the method/wireless device/computer program product stops retransmitting the uplink data after transmitting a maximum number of retransmissions.

In certain embodiments, wherein the control channel comprises a Physical Downlink Control Channel (PDCCH).

According to certain embodiments, a method for use in a network node is disclosed. The method comprises configuring a wireless device to transmit according to a semi-persistent scheduling (SPS) configuration. The uplink data is transmitted without transmitting padding when no data is available for transmission. The method further comprises receiving a transmission of the uplink data from the wireless device according to the SPS configuration. The method further comprises transmitting an indication to the wireless device via a control channel. The indication indicates to transmit new uplink data to the network node. The indication is transmitted in response to receiving the transmission of the uplink data from the wireless device.

According to certain embodiments, a network node comprising storage operable to store instructions and a processor operable to execute the instructions. The network node is operable to configure a wireless device to transmit according to a semi-persistent scheduling (SPS) configuration. The uplink data is transmitted without transmitting padding when no data is available for transmission. The network node is further operable to receive a transmission of the uplink data from the wireless device according to the SPS configuration. The network node is further operable to transmit an indication to the wireless device via a control channel. The indication indicates to transmit new uplink data to the network node. The indication is transmitted in response to receiving the transmission of the uplink data from the wireless device.

According to certain embodiments, a computer program product comprises a non-transitory computer readable medium storing computer readable program code. The computer readable program code comprises program code for configuring a wireless device to transmit according to a semi-persistent scheduling (SPS) configuration. The uplink data is transmitted without transmitting padding when no data is available for transmission. The computer readable program code further comprises program code for receiving a transmission of the uplink data from the wireless device according to the SPS configuration. The computer readable program code further comprises program code for transmitting an indication to the wireless device via a control channel. The indication indicates to transmit new uplink data to the network node. The indication is transmitted in response to receiving the transmission of the uplink data from the wireless device.

The above-described method, network, and/or computer program code may include various other features, including any one or more of the following:

In certain embodiments, the method/network node/computer program product stops transmission of indications on a Physical Hybrid-ARQ Indicator Channel (PHICH) to the wireless device.

In certain embodiments, the method/network node/computer program product receives, in response to the transmission of the indication sent on the control channel, new uplink data from the wireless device.

In certain embodiments, the new uplink data is buffered hybrid automatic repeat request (HARQ) data prioritized over non-buffered data available to the wireless device for transmission.

In certain embodiments, the SPS configuration comprises a periodicity of one transmission time interval (TTI).

In certain embodiments, the method/network node/computer program product transmits the indication on the control channel by addressing the indication to a semi-persistent scheduling-cell radio network temporary identifier (SPS-CRNTI) associated with the wireless device.

In certain embodiments, the method/network node/computer program product transmits the indication on the control channel by indicating to the wireless device to transmit the uplink data using unlicensed radio resources.

In certain embodiments, the method/network node/computer program product receives a retransmission of the uplink data from the wireless device after transmitting the indication that the wireless device is to transmit new uplink data to the network node. The method/network node/computer program product further retransmits the indication on the control channel to the wireless device to transmit new uplink data to the network node.

In certain embodiments, the method/network node/computer program product transmits a Radio Resource Control (RRC) reconfiguration message to the wireless device. The method/network node/computer program product further transmits indications on a PHICH.

In certain embodiments, wherein the control channel comprises a Physical Downlink Control Channel (PDCCH).

Certain embodiments of the present disclosure may provide one or more technical advantages. For example, certain embodiments may advantageously enhance instant uplink access operation by not mandating the network node to always transmit PHICH. As another example, certain embodiments may advantageously switch between IUA without always on feedback to regular IUA when the traffic characteristics change. As yet another example, certain embodiments may advantageously enable contention based access for wireless devices using IUA without always on feedback by configuring the wireless devices with different HARQ round trip times or randomly triggering retransmission by the wireless devices. As another example, certain embodiments may advantageously allow the network node to save energy by not sending PHICH to wireless devices with IUA without always on feedback. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
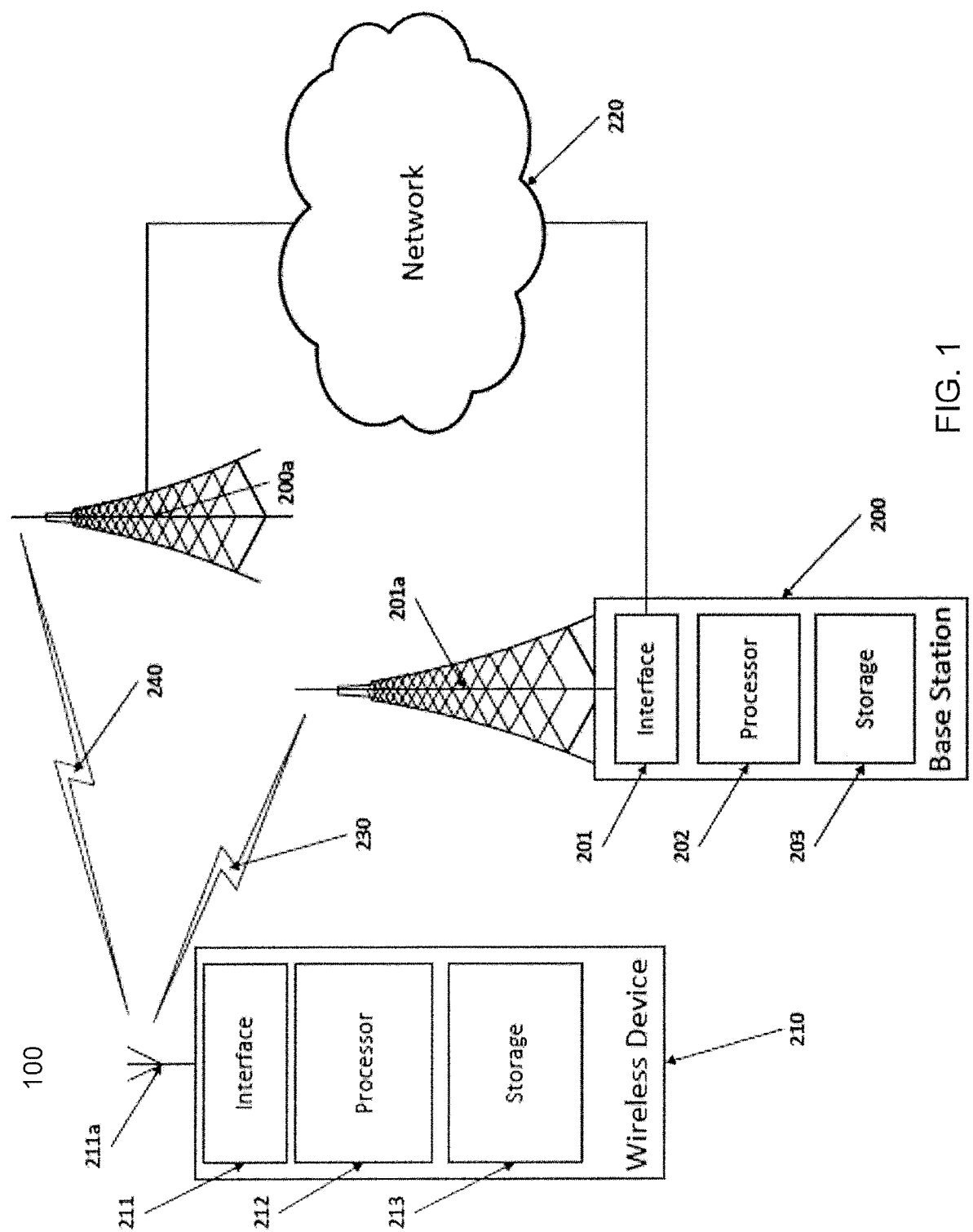
FIG. 1 is a block diagram illustrating an embodiment of a wireless communications network 100, in accordance with certain embodiments.

According to certain embodiments, it is proposed herein to enhance the IUA operation by not mandating the eNB to always transmit PHICH. When configured with IUA, the UE may be configured to ignore PHICH and assume always NACK as received HARQ feedback. This way, non-adaptive retransmissions take place in case of missing eNB-response to a previous transmission. This means no data is lost on HARQ. Furthermore, the eNB may acknowledge (ACK) a successful transmission from the UE based on a PDCCH indication. This leads to a new data transmission on the current HARQ process. Furthermore, UE's might be provided with the same UL SPS resources and might collide. The disclosure further outlines methods to handle these collisions. In order to keep the resource and energy efficiency of the network optimum for non-sporadic traffic as well, the disclosure also proposes an iterative switching mechanism to PHICH based IUA and dynamic uplink scheduling.

IUA generally allows low latency uplink access. This is beneficial for many applications and enhances the interactiveness and end user experience. This low latency is an enabling requirement some applications, such as critical machine type communication. In certain embodiments, network node energy savings are enhanced compared to conventional IUA described in Rel-14 since always-on PHICH transmissions are not needed. Furthermore, in certain embodiments, the enhanced IUA operation causes no HARQ data loss even if the network node misses an uplink data transmission. This also lowers the eNB requirement on its transmission detection capabilities. Also, certain embodiments require less or equal control overhead compared to dynamic scheduling where PDCCH is always used. In some embodiments, the enhanced IUA operation may be supported in TDD mode or using unlicensed bands, such as in LAA or multeFire.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Some of the embodiments contemplated herein will now be described more fully hereinafter with reference to the accompanying drawings. Other embodiments, however, are contained within the scope of this disclosure and the disclosure should not be construed as limited to only the embodiments set forth herein; rather, these embodiments are provided by way of example to convey the scope of the inventive concept to those skilled in the art. Like numbers refer to like elements throughout the description.

There is proposed herein embodiments which enhance the IUA operation by not mandating the eNB to always transmit PHICH. When configured with IUA, the UE may be configured to ignore PHICH and assume always NACK as received HARQ feedback. The configuration may be done via RRC signaling. With this UE behavior, non-adaptive retransmissions take place in case of missing eNB-response to a previous transmission. This means no data is lost on HARQ. The new UE behavior is summarized in Table 2 below.

TABLE 2

New UE behavior

| HARQ buffer of current process | PHICH reception | New data available? | PHICH ignored NACK assumed |
|---|---|---|---|
| Empty | ACK | Yes | Transmit new data |
| Empty | ACK | No | Do nothing |
| Empty | NACK | Yes | Transmit new data |
| Empty | NACK | No | Do nothing |
| Full | ACK | Yes | Non-adaptive retransmission (prioritized) |
| Full | ACK | No | Non-adaptive retransmission |
| Full | NACK | Yes | Non-adaptive retransmission (prioritized) |
| Full | NACK | No | Non-adaptive retransmission |

HARQ processes are configured to be reset after a number of retransmissions. Similarly, in the embodiments proposed herein, a HARQ process is reset, i.e. emptied, after a number of retransmissions is reached. Furthermore, the eNB may acknowledge (ACK) a successful transmission from the UE based on a PDCCH/e-PDCCH indication. This leads to a new data transmission on the current HARQ process, i.e. to an override/reset/emptying of the current HARQ buffer, and filling of the HARQ buffer with the new data.

For a UE configured with an IUA i.e. SPS uplink grant, transmission parameters such as resource allocation, modulation and coding scheme (MCS) etc. are configured by the first SPS grant received on PDCCH. Afterwards:

In some embodiments, the further PDCCH indication acknowledging a previous data transmission may be transmitted in the same format, i.e. addressed to the SPS CRNTI of the UE and providing resource allocation and MCS information, just like the first grant. The UE however may interpret this subsequent similar grant as "ACK" for the current HARQ process (i.e. process corresponding to the TTI when the PDCCH was received, i.e. the uplink grant is valid for). Alternatively, the UE may interpret this PDCCH indication as "ACK" for several processes, i.e. the X previous or Y subsequent processes. This is beneficial if UE sent data on all those processes and the eNB could successfully decode all of them. In yet another alternative the HARQ process ID of the process to be ACKed may be included in the PDCCH indication (like in asynchronous HARQ operation).

In certain embodiments of this disclosure, the further PDCCH may be of a different new downlink control information (DCI) format. The PDCCH may be addressed to the SPS CRNTI, to indicate its relevance for the previous configured SPS/IUA resources. However, information such as resource allocation and MCS are not required, since they can be kept from the previous PDCCH configured uplink grant. Therefore, the new PDCCH indication may have a reduced format, compared to legacy formats (i.e. smaller format), to indicate the ACK. No fields or only an "ACK" field may be included in the DCI. In some instances, only an NDI field may be included in the DCI. This may even be set to a predefined value, e.g. 1, to be interpreted as ACK.

Also, some fields of a legacy PDCCH (i.e. DCI) format may be fixed, to indicate "ACK". This is similar (but not the same fixed fields) to the SPS-release indication on PDCCH. There SPS release is understood if specific fields in the DCI are validated to be set to specific values.

Furthermore, a specific "ACK"-SPS-CRNTI for the UE could be defined. If the PDCCH is addressed to this CRNTI, the UE interprets it as ACK for SPS/IUA HARQ process(es).

In yet another embodiment, the UE is not required to send a confirmation of the received PDCCH ACK i.e., no MAC control element to confirm PDCCH UL grant reception, like in Rel-14 IUA, is sent.

Assuming sporadic uplink traffic, most of the time, the configured uplink resources will be unused, so no uplink transmission takes place. The advantage of this solution is the eNB is not required to always transmit NACK on PHICH. The eNB only needs to transmit a PDCCH ACK in case of a successful uplink transmission. Compared to legacy dynamic scheduling, where the PDCCH is sent to start each required data transmission, the PDCCH is sent equally often in this solution, i.e. after each successful data transmission. Thus, it does not yield a higher control overhead.

One potential error case to consider is that it may happen that the eNB could successfully decode an uplink transmission and sends the ACK on PDCCH, but the UE does not receive the PDCCH due to PDCCH decoding error. In this case no HARQ data would be lost, since the UE interprets the missing PDCCH as NACK and does a non-adaptive retransmission. However, the eNB needs to be prepared to receive a non-adaptive retransmission in this case, even though it scheduled a new data transmission. In one embodiment of this disclosure, the eNB is prepared to decode both transmissions (redundancy version 0) and retransmissions (potentially increased redundancy version). In case a higher redundancy version was used, the eNB knows that a retransmission had taken place and that its previously transmitted PDCCH was not received by the UE. The eNB may for a subsequent PDCCH transmission, use a more robust coding for the PDCCH. In case no higher redundancy version was used, the eNB can compare the potential retransmission with a previous transmission for comparison, and in case they are equal also determine that it was a retransmission. Since the original transmission was decodable earlier, the retransmission can be simply ignored.

On Traffic Pattern Change Handling:

In case the uplink traffic pattern changes from sporadic to non-sporadic, the energy efficiency gains achieved by skipping PHICH are no more applicable since the overhead of sending PDCCH ACK is higher than the lighter PHICH response in that case. The disclosure describes an embodiment to handle this change in traffic pattern as follows:

Two uplink grant utilization thresholds should be defined by the network. In the case of sporadic UL traffic, UE would be below both thresholds in terms of grant utilization and the network utilized the proposed IUA without always on feedback. Once the uplink grant utilization increases above the lower threshold, the network switch to IUA with always on feedback. The switch may be indicated through a RRC reconfiguration message. The reason for this switch is that the added advantage of skipping PHICH are not viable anymore since the overhead of consecutive PDCCH ACK is much higher than consecutive PHICH response. Thus, it would be more energy efficient in terms of size of the feedback and energy required for transmission for relatively higher traffic than sporadic traffic. Now, if the grant utilization increases further and crosses the second higher traffic threshold, the traffic pattern is non-sporadic now and the network would switch to legacy dynamic uplink scheduling which would help to empty UE buffer quickly with bigger feedbacks and less PHICH is involved. This would overcome the limitation of IUA with always on feedback including static link adaptation as well as small grant allocations. The benefit of this iterative switching mechanism is that the network and UE would adapt towards the most energy and resource efficient uplink access mechanism based on changing traffic requirements of the UE.

The two traffic thresholds would thus decide the switch between sporadic traffic to mix traffic and non-sporadic, respectively. One way to define these thresholds is to monitor the grant utilization pattern. So, if the UE utilizes for example 50% of the grants per frame, it is a mix traffic and network can switch to IUA with always on feedback. In case, the UE utilizes all uplink grants for more than three consecutive frames, it reflects the traffic pattern had changed to non-sporadic and the second threshold is met. The network should then trigger dynamic uplink scheduling for most optimum resource and energy utilization.

On Contention Based Access:

In case of a contention based access, where the same uplink resources are assigned to multiple UEs, collisions of parallel uplink transmissions from different UEs might happen. If the eNB is able to distinguish the failing transmission attempts, the eNB may issue an adaptive and/or asynchronous retransmission via PDCCH of one or multiple colliding UEs (which overrides the non-adaptive retransmission behavior). This way further collisions are avoided, since UEs are configured to retransmit either in different frequency resources or different time resources. In the case the eNB is not able to detect collisions of any of the transmitting UEs, the UEs will continue colliding in their non-adaptive retransmissions. A few possible solutions are described to handle this situation:

- The UEs that are assigned the same SPS resource are configured with different numbers of HARQ processes, i.e. different HARQ round trip times (RTTs). This way, processes that are colliding initially, will not collide in their non-adaptive and synchronous retransmission times anymore. Example: UE1 is configured with 8 HARQ processes, and does an initial transmission at t0, retransmission at t8, t16 etc. A second UE is configured with 9 HARQ processes, and transmits at t0, t9, t18 etc.
- Alternatively, whether non-adaptive retransmissions are triggered by the UE could be randomized. In one simple solution, a non-adaptive retransmission opportunity could be skipped, if configured, if a randomly drawn ratio is below or above a configured ratio. It could further be configured that this behavior only applies after a number of Z first retransmission attempts, which gives the chance for the eNB to be able to decode. Only in the worst case where the eNB is not able to decode several times, the randomized skip behavior applies. For example: UE1 and UE2 are configured to skip a non-adaptive retransmission from the third transmission attempt onwards, and this only with a 50% chance.
- Furthermore, this "random non-adaptive retransmission skip behavior" could be disabled, e.g. overridden in case the eNB sends a NACK to the UE. In this disclosure, the NACK would be received on PDCCH. Either as part of an adaptive or asynchronous retransmission request (prior art), or as part of a new PDCCH indication (new DCI) format, decided for this purpose. Once received, a non-adaptive retransmission would be done (the random function would not be evaluated to skip it). This has the advantage of full eNB control, e.g. in case the eNB was able to detect but not decode the UE transmission, and does not want that a subsequent retransmission is skipped (e.g. since there is no collision to be avoided).
- As another solution, if the network observes consecutive collisions on parallel allocated IUA grants, it means the allocations are more than optimum and the network should revert back some UE's to legacy dynamic scheduling. The network can define a collision threshold period for triggering a switch to dynamic scheduling, i.e. collision for one consecutive frame.

Certain embodiments may have one more of the following features:

UE uplink traffic assumed to be sporadic

UE configured with IUA

UE ignores PHICH. UE assumes always NACK (opposed to asynchronous HARQ, where UE assumes always ACK).

eNB does not send PHICH, saves energy.

No data on HARQ is lost, since the processes are not overridden (when ACK is assumed and new data overrides the buffer).

Without any further indication from eNB; with this configuration: the UE will be able to instantly transmit on IUA resources, but will also do non-adaptive retransmissions (until max retransmission threshold is reached) on IUA resources (i.e. non-adaptive retransmissions are prioritized, as in current IUA).

The eNB ACK=NDI toggled is indicated via PDCCH—eNB sends ACK only when it was able to decode transmission. Assuming sporadic traffic, these transmissions do not happen that often (overhead low). The PDCCH ACK is only sent once per UL transmissions (as often as in dynamic scheduling. However in dynamic scheduling it is sent before transmission, in this solution it is used as ACK, i.e. send once after each transmission).

This PDCCH would be indicated to SPS-CRNTI. It does not require full-DCI, except the "ACK" so can use a new optimized DCI format. Although the solutions described above may be implemented in any appropriate type of system using any suitable components, particular embodiments of the described solutions may be implemented in a wireless network such as the example wireless communication network 100 illustrated in FIG. 1. In the example embodiment of FIG. 1, wireless communication network 100 provides communication and other types of services to one or more wireless devices. In the illustrated embodiment, the wireless communication network includes one or more instances of network nodes that facilitate the wireless devices' access to and/or use of the services provided by wireless communication network 100. Wireless communication network 100 may further include any additional elements suitable to support communication between wireless devices or between a wireless device and another communication device, such as a landline telephone.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Wireless communication network 100 may represent any type of communication, telecommunication, data, cellular, and/or radio network or other type of system. In particular embodiments, wireless communication network 100 may be configured to operate according to specific standards or other types of predefined rules or procedures. Thus, particular embodiments of wireless communication network 100 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 1 illustrates a wireless network comprising a more detailed view of network node 200 and wireless device (WD) 210, in accordance with a particular embodiment. For simplicity, FIG. 1 only depicts network 220, network nodes 200 and 200a, and WD 210. Network node 200 comprises processor 202, storage 203, interface 201, and antenna 201a. Similarly, WD 210 comprises processor 212, storage 213, interface 211 and antenna 211a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device and/or with other equipment in wireless communication network 100 that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to wireless communication network 100 or to provide some service to a wireless device that has accessed wireless communication network 100.

As used herein, the term "radio node" is used generically to refer both to wireless devices and network nodes, as each is respectively described above.

In FIG. 1, Network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). As another example, network node 200 may be a virtual network node in which multiple different physically separate components interact to provide the functionality of network node 200 (e.g., processor 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless device, such as WD 210, including any of the features or benefits disclosed herein. For example, in certain embodiments, processor 202 may execute instructions to perform the method discussed with respect to FIG. 4.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signaling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" (WD) refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the $3^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 1, WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein. For example, in certain embodiments, processor 212 may execute instructions to perform the method discussed with respect to FIG. 3.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signaling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Figure 2:
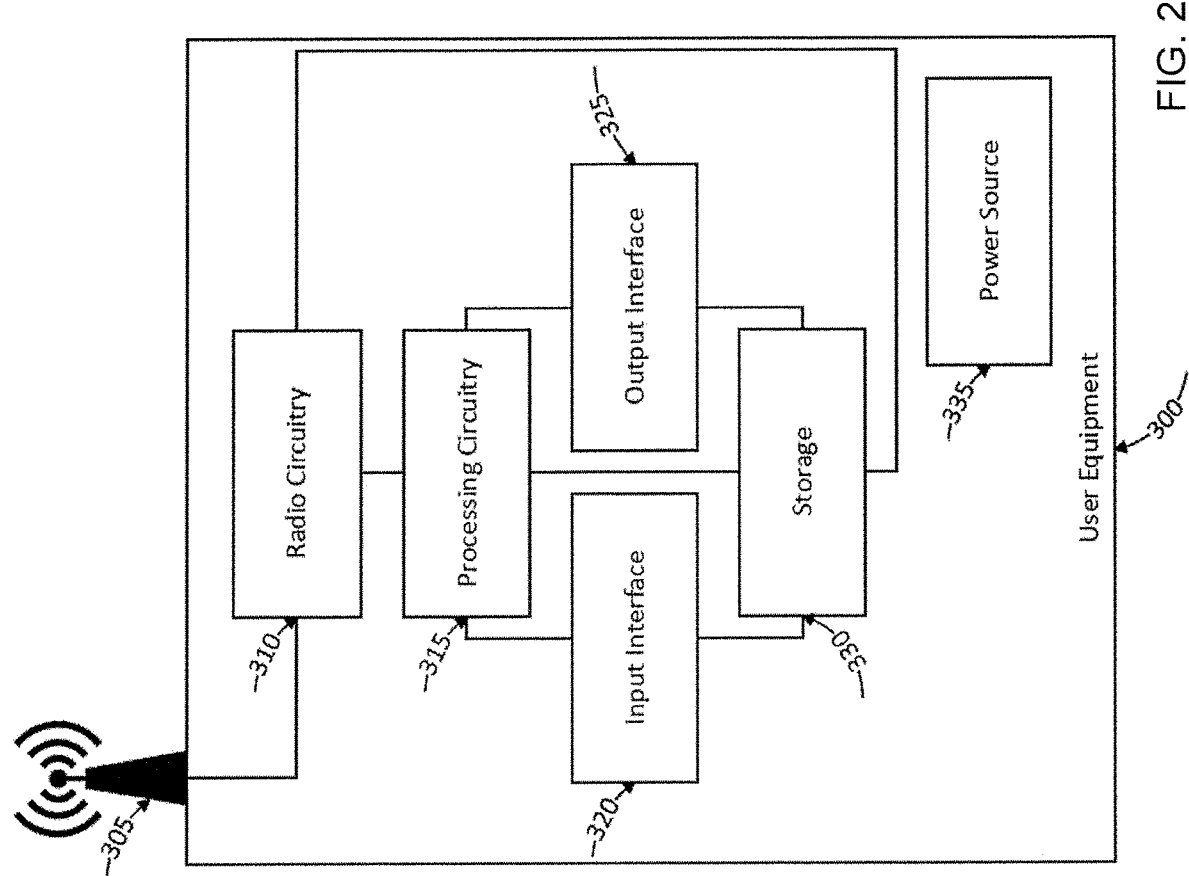
FIG. 2 is a block schematic of an exemplary wireless device, in accordance with certain embodiments.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used. As shown in FIG. 2, user equipment 300 is an example wireless device. UE 300 includes an antenna 305, radio front-end circuitry 310, processing circuitry 315, and a computer-readable storage medium 330. Antenna 305 may include one or more antennas or antenna arrays, and is configured to send and/or receive wireless signals, and is connected to radio front-end circuitry 310. In certain alternative embodiments, wireless device 300 may not include antenna 305, and antenna 305 may instead be separate from wireless device 300 and be connectable to wireless device 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain alternative embodiments, wireless device 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 315 executing instructions stored on a computer-readable storage medium 330. In alternative embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination. For example, in certain embodiments, processing circuitry 315 may execute instructions to perform the method discussed with respect to FIG. 3.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Computer-readable storage medium 330 is generally operable to store instructions, such as a computer program, software, an application including one or more of logic, rules, code, tables, etc. and/or other instructions capable of being executed by a processor. Examples of computer-readable storage medium 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Alternative embodiments of UE 300 may include additional components beyond those shown in FIG. 2 that may be responsible for providing certain aspects of the UE's functionality, including any of the functionality described herein and/or any functionality necessary to support the solution described above. As just one example, UE 300 may include input interfaces, devices and circuits, and output interfaces, devices and circuits. Input interfaces, devices, and circuits are configured to allow input of information into UE 300, and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 300, and are connected to processing circuitry 315 to allow processing circuitry 315 to output information from UE 300. For example, output interfaces, devices, or circuits may include a speaker, a display, vibrating circuitry, a USB port, a headphone interface, or other output elements. Using one or more input and output interfaces, devices, and circuits, UE 300 may communicate with end users and/or the wireless network, and allow them to benefit from the functionality described herein.

As another example, UE 300 may include power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, Wi-Fi, or Bluetooth wireless technologies. These wireless technologies may be integrated into the same or different chipsets and other components within wireless device 300.

Figure 3:
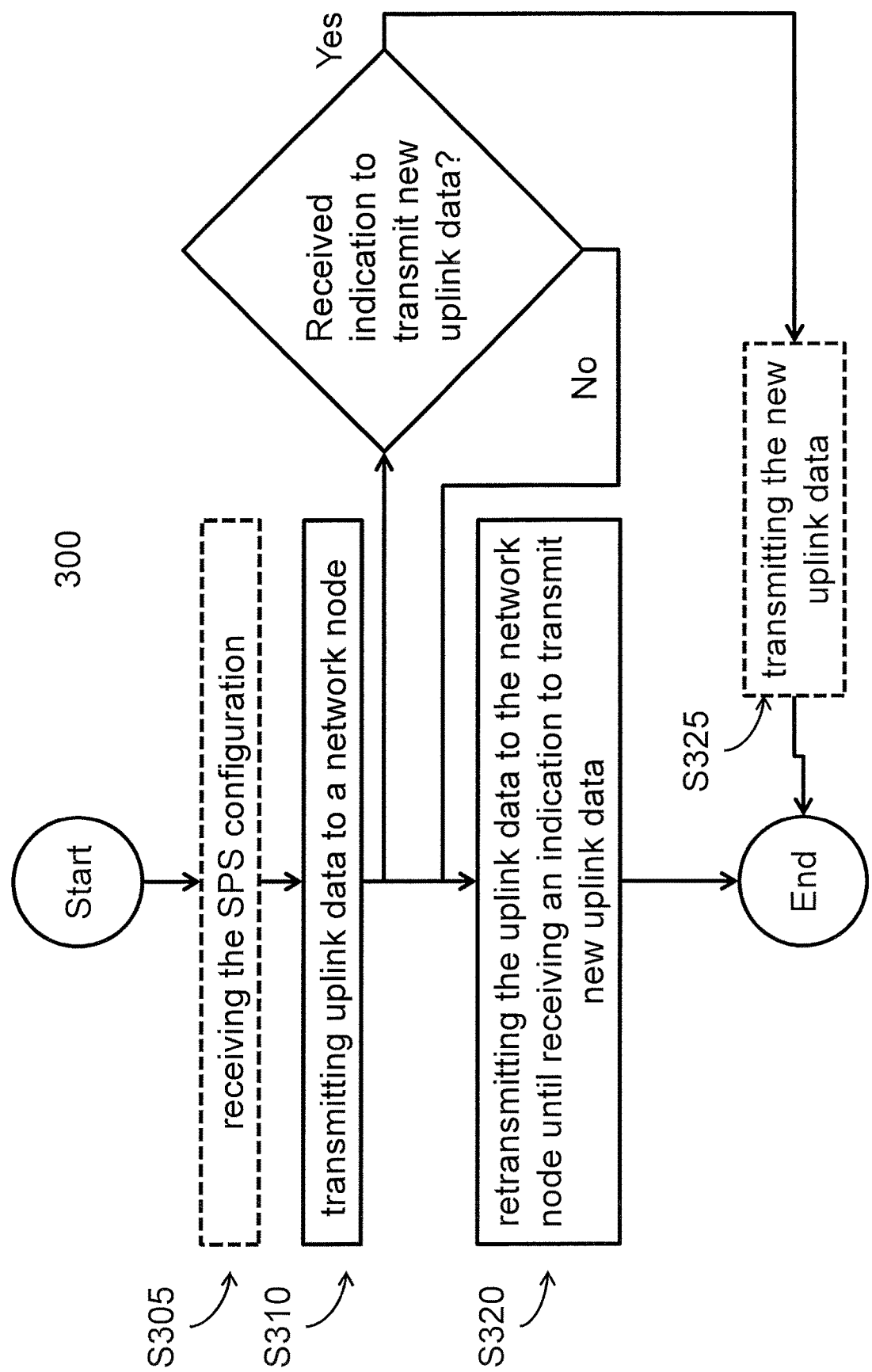
FIG. 3 is a flow diagram of a method in a wireless device, in accordance with certain embodiments.

FIG. 3 is a flow diagram of a method in a wireless device, such as wireless device 210 of FIG. 1 or UE 300 of FIG. 2. At step S310, wireless device 210 transmits uplink data to a network node. The uplink data may be transmitted according to a semi-persistent scheduling (SPS) configuration obtained from network node 200. In certain embodiments, the uplink data is transmitted without transmitting padding when no data is available for transmission.

At step S320, wireless device 210 retransmits the uplink data to network node 200 until receiving an indication to transmit new uplink data. The indication may be received from the network node 200 via a control channel. In some embodiments, the control channel comprises a Physical Downlink Control Channel (PDCCH). As an example, the indication may comprise a grant of resources for transmitting new uplink data.

In certain embodiments, wireless device 210 may check whether it has received an indication to transmit new uplink data. For example, network node 200 may transmit such an indication to wireless device 210 in response receiving the uplink data that wireless device transmitted in S310. If no such indication has been received, wireless device 210 may continue to step 320 or additionally and/or alternatively, wireless device 210 may repeat step 320 until such indication is received or other rules or logic stops retransmission. If wireless device 210 receives an indication to transmit new uplink data, it may stop any retransmission of the previously transmitted uplink data and schedule transmission of new uplink data.

In certain embodiments, additional steps may be included in addition to steps S310 and S320. For example, at optional step S305, wireless device 210 may receive the SPS configuration from network node 200 prior to transmitting the uplink data. In some embodiments, wireless device 210 may receive a SPS configuration from a different source, such as a different network node or control node, or may determine a SPS configuration at wireless device 210.

In certain embodiments, wireless device 210 may in optional step S325, transmit the new uplink data to network node 200 in response to receiving the indication from network node 200 via the control channel. For example, once wireless device 210 receives the indication from network node 200 (i.e., the indication discussed with respect to S320) wireless device 210 may subsequently transmit new uplink data. New uplink data may include buffered HARQ data and/or non-buffered data available for uplink transmission. In some embodiments, wireless device 210 may prioritize transmission of buffered hybrid automatic repeat request (HARQ) data as the new uplink data. For example, if wireless device 210 receives an indication from network node 210 to transmit new uplink data and wireless device 210 has new data available to transmit and buffered HARQ data, wireless device 210 may transmit the buffered HARQ data first over the newly available data. In this manner, the buffered HARQ data is not further delayed from transmission, and the ordering of transmissions may be maintained.

In certain embodiments, wireless device 210 may ignore indications from the network node on a Physical Hybrid-ARQ Indicator Channel (PHICH). If not all wireless devices in the cell or connected to network node 200 are configured with IUA, network node 200 may continue to transmit ACK/NACK signals over PHICH. Wireless device 210, in certain embodiments, may ignore such signals and instead assume NACK and retransmit buffered data based on that assumption. Combining this feature with the enhanced IUA functionality enables the UE to retransmit until receiving an indication to transmit new uplink data from network node 200. In this manner, wireless device 210 interprets receiving an indication to transmit new uplink data as an indication that network node 200 successfully received the previous transmission.

In certain embodiments, the indication to transmit the new uplink data comprises a grant of uplink resources received from network node 200 on the control channel. For example, the indication may provide a grant to wireless device 210 to uplink resources on which to transmit the buffered HARQ data or newly available data. In this manner, wireless device 210 may receive not only an indication that the previous transmission of the uplink data has been successful, but also that it may transmit additional information. In some embodiments, the grant of uplink resources is addressed to a semi-persistent scheduling-cell radio network temporary identifier (SPS-CRNTI) associated with the wireless device.

In certain embodiments the SPS configuration comprises a periodicity of one transmission time interval (TTI). In this manner, consecutive TTIs may be persistently allocated to wireless device 210. This may enable wireless device 210 to transmit uplink data on consecutive TTIs.

In certain embodiments, wireless device 210 in step S310 transmits the uplink data using unlicensed radio resources. For example, in certain embodiments, UL and DL resources overlap in frequency or resources are not allocated in a TDD configuration. In these cases, wireless device 210 may transmit the uplink data using unlicensed radio resources to avoid conflict and interference. In this manner, wireless device 200 may enhance the transmission of uplink data by using unlicensed radio resources to improve the probability that the uplink transmission will be successful.

In certain embodiments, wireless device 210 in step S310 transmits the uplink data according to a time division duplex configuration. Wireless device 210 may be configured to transmit according to a TDD configuration prior to transmitting the uplink data to network node 200.

In certain embodiments, wireless device 210 stops retransmitting the uplink data after transmitting a maximum number of retransmissions. In certain situations, wireless device 210 may not receive an indication from network node 200. For example, network node 200 may attempt to send an indication in response to receiving uplink data from wireless device 210, but it may not be received at wireless device 210 due to interference or errors in transmission/reception. As another example, network node 200 may not properly send the indication to wireless device 210. In these circumstances, wireless device may be configured to stop retransmission (S320) despite not receiving the indication from network node 200 after a certain number of retransmission. In this manner, wireless device 210 may continue to transmit additional uplink data when it is likely that the previous uplink data was received at network node 200 or may conserve resources by not transmitting when uplink data is unlikely to be received.

In certain embodiments, wireless device 210 receives a message from network node 200 indicating to fallback to a negative acknowledgement (NACK) procedure for performing retransmissions. For example, wireless device 210 may begin transmitting less sporadically. Network node 200 may recognize the level of traffic from wireless device 210 and indicate in a message to wireless device 200 to switch back to the regular IUA behavior. In this manner, wireless device 210 may be informed when the circumstances indicate that the regular IUA behavior may be most advantageous or enable a reduction in resources expended in wireless communications network 100. In some embodiments, the NACK procedure comprises transmitting padding when no data is available for transmission.

In certain embodiments, the NACK procedure comprises monitoring a Physical Hybrid-ARQ Indicator Channel (PHICH) for NACK messages and wherein the message from network node 200 indicating to fallback to the NACK procedure comprises a Radio Resource Control (RRC) reconfiguration message. In this manner, the wireless device 210 may receive the appropriate configuration to fallback to the NACK procedure and operate in a more efficient manner based on the level of traffic.

Figure 4:
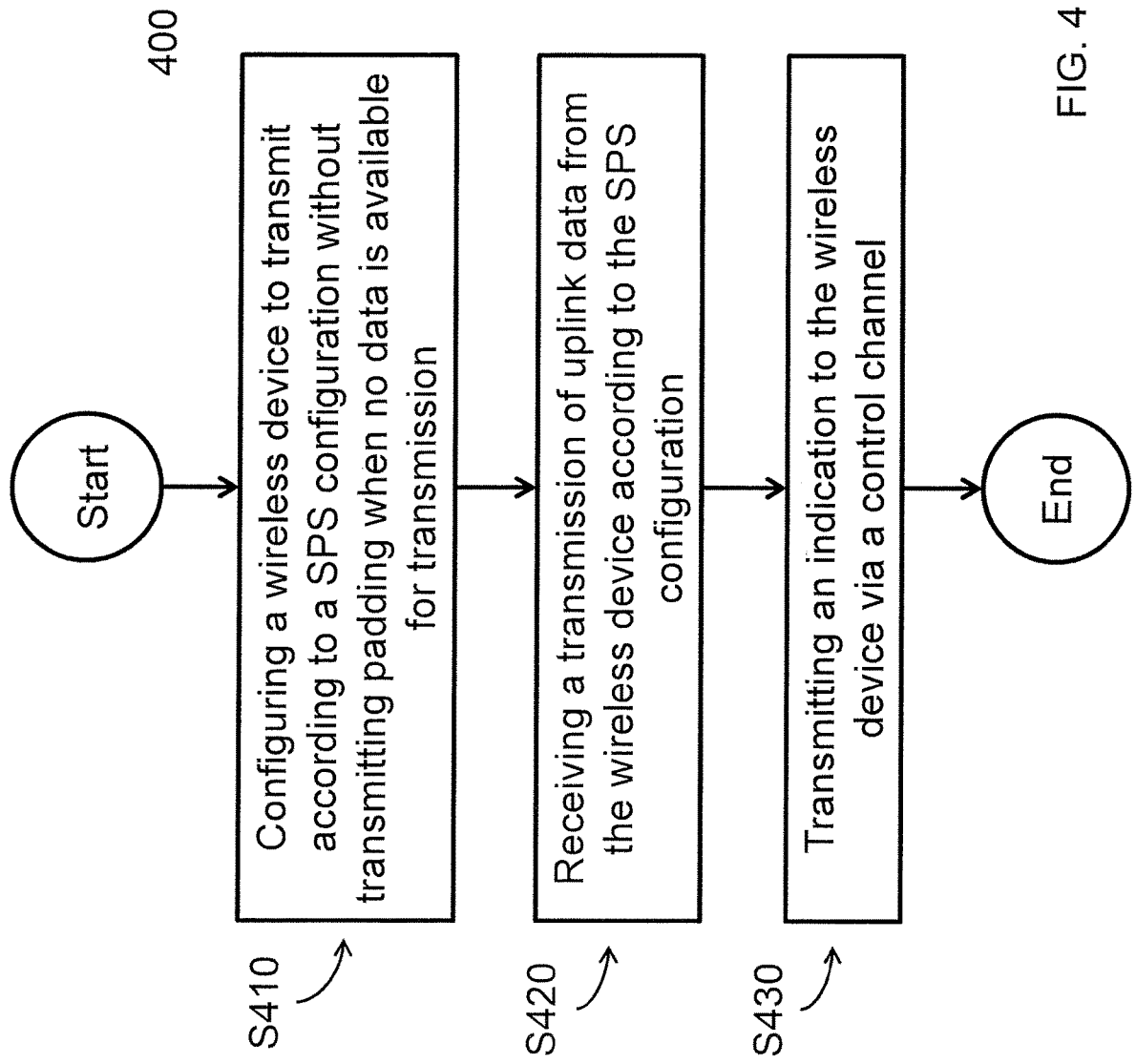
FIG. 4 is a flow diagram of a method in a network node, in accordance with certain embodiments.

FIG. 4 is a flow diagram of a method in network node 200, in accordance with certain embodiments. At step S410, network node 200 configures wireless device 210 to transmit according to a semi-persistent scheduling (SPS) configuration. The uplink data may be transmitted from wireless device 210 without transmitting padding when no data is available for transmission.

At step S420, network node 200 receives a transmission of the uplink data from wireless device 210 according to the SPS configuration.

At step S430, network node 200 transmits an indication to wireless device 200 via a control channel. The indication may indicate to transmit new uplink data to the network node. Network node 200 may transmit the indication in response to receiving the transmission of the uplink data from wireless device 210. In some embodiments, the control channel comprises a Physical Downlink Control Channel (PDCCH). In some embodiments, the indication comprises a grant of resources for transmitting the new uplink data. In certain embodiments, the grant of uplink resources is addressed to a semi-persistent scheduling-cell radio network temporary identifier (SPS-CRNTI) associated with the wireless device.

In certain embodiments, network node 200 stops transmission of ACK and/or NACK indications on a Physical Hybrid-ARQ Indicator Channel (PHICH) to wireless device 210. For example, network node 200 may determine that wireless device 210 operates with an enhanced IUA configuration that ignores PHICH indications and assumes a NACK response. Network node 200 may then stop transmission of ACK and/or NACK indications on the PHICH as those indications no longer serve their intended purpose. In this manner, configuring wireless device 210 with enhanced IUA may allow network node 200 to reduce ACK/NACK transmissions and/or particular transmissions to wireless device 210 on PHICH.

In certain embodiments, network node 200 also receives new uplink data from wireless device, e.g., in response to network node 200's transmission of the indication in S430. For example, wireless device 210 may receive the indication of S430 and may transmit new uplink data, e.g., buffered HARQ data and/or newly available uplink data, in response. Network node 200 may receive the new uplink data. In some embodiments, network node 200 may then transmit a subsequent indication on the control channel to indicate that network node 200 has received the new uplink data from wireless device 210. In this manner, network node 200 may continue to receive new uplink data from wireless device 210 according to the enhanced features of IUA. In some embodiments, the new uplink data is buffered hybrid automatic repeat request (HARQ) data prioritized over non-buffered data available to the wireless device for transmission.

In certain embodiments the SPS configuration comprises a periodicity of one transmission time interval (TTI). In this manner, consecutive TTIs may be persistently allocated to wireless device 210. This may enable wireless device 210 to transmit uplink data on consecutive TTIs.

In certain embodiments, network node 200 in step S430 transmits the indication to wireless device 200 using unlicensed radio resources. For example, in certain embodiments, UL and DL resources overlap in frequency or resources are not allocated in a TDD configuration. In these cases, network node 200 may transmit the indication using unlicensed radio resources to avoid conflict and interference. In this manner, network node 200 may enhance the transmission of uplink data by using unlicensed radio resources to improve the probability that the transmission and reception of the indication will be successful.

In certain embodiments, network node 200 may receive a retransmission of previous uplink data from wireless device 210 after transmitting the indication in step S430 for wireless device 210 to transmit new uplink data. For example, wireless device 210 may not have received the indication from network node 200, and/or wireless device 210 may be improperly configured to receive such an indication to transmit new uplink data. In these cases, wireless device 210 may continue to retransmit the uplink data despite network node 200 providing the indication. In some embodiments, network node 200 may then retransmit the indication on the control channel to wireless device 210 to transmit new uplink data to the network node 200. In this manner, wireless device 210 may be able to receive the retransmission of the indication, which may then prompt wireless device 210 to stop retransmission of that particular uplink data and transmit new uplink data.

In certain embodiments, network node 200 may transmit a Radio Resource Control (RRC) reconfiguration message to wireless device 210. For example, network node 200 may configure wireless device 210 prior to communication between wireless device 210 and network node 200. The RRC message may include various parameters that control the behavior of wireless device 210 in response to various indications and/or transmission from network node 200 and behavior in response to uplink data to be communicated to network node 200. In some embodiments, the RRC message may be a reconfiguration message that indicates to wireless device 210 to switch from the IUA without always-on feedback to the regular IUA configuration. For example, at certain thresholds of traffic volume from wireless device 210, it may be advantageous to switch to the always-on feedback to reduce transmission resources and interference. In certain embodiments, network node 200 may then transmit ACK and/or NACK indications on a PHICH. For example, after receiving the RRC reconfiguration message, wireless device 210 may begin listening on the PHICH for an ACK/NACK response to its uplink transmissions and based on those indications, transmit new data or retransmit the uplink data.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 203 may comprise computer readable means on which a computer program can be stored. The computer program may include instructions which cause processor 202 (and any operatively coupled entities and devices, such as interface 201 and storage 203) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method in a wireless device, comprising:
transmitting uplink data to a network node, the uplink data transmitted according to a semi-persistent scheduling (SPS) configuration obtained from the network node wherein the SPS configuration specifies a number of hybrid automatic repeat request (HARQ) processes, the number greater than 1, wherein uplink data is transmitted via at least a first HARQ process without transmitting padding during at least a second HARQ process in which no data is available for transmission; and
retransmitting the uplink data to the network node until receiving an indication to transmit new uplink data, the indication received from the network node via a control channel.

2. The method of claim 1, further comprising receiving the SPS configuration from the network node prior to transmitting the uplink data.

3. The method of claim 1, further comprising transmitting the new uplink data to the network node in response to receiving the indication from the network node via the control channel.

4. The method of claim 3, further comprising prioritizing transmission of buffered hybrid automatic repeat request (HARQ) data as the new uplink data.

5. The method of claim 1, further comprising ignoring indications from the network node on a Physical Hybrid-ARQ Indicator Channel (PHICH).

6. The method of claim 1, wherein the indication to transmit the new uplink data comprises a grant of uplink resources received from the network node on the control channel.

7. The method of claim 6, wherein the grant of uplink resources is addressed to a semi-persistent scheduling-cell radio network temporary identifier (SPS-CRNTI) associated with the wireless device.

8. The method of claim 1, wherein the SPS configuration comprises a periodicity of one transmission time interval (TTI).

9. The method of claim 1, wherein transmitting the uplink data to the network node comprises transmitting the uplink data using unlicensed radio resources.

10. The method of claim 1, wherein transmitting the uplink data to the network node comprises transmitting the uplink data according to a time division duplex configuration.

11. The method of claim 1, further comprising receiving a message from the network node indicating to fallback to a negative acknowledgement (NACK) procedure for performing retransmissions.

12. The method of claim 11, wherein the NACK procedure comprises transmitting padding when no data is available for transmission.

13. The method of claim 11, wherein the NACK procedure comprises monitoring a Physical Hybrid-ARQ Indicator Channel (PHICH) for NACK messages and wherein the message from the network node indicating to fallback to the NACK procedure comprises a Radio Resource Control (RRC) reconfiguration message.

14. The method of claim 1, further comprising stopping retransmitting the uplink data after transmitting a maximum number of retransmissions.

15. The method of claim 1, wherein the control channel comprises a Physical Downlink Control Channel (PDCCH).

16. A method in a network node, comprising:
configuring a wireless device to transmit data according to a semi-persistent scheduling (SPS) configuration wherein the SPS configuration specifies a number of hybrid automatic repeat request (HARQ) processes, the number greater than 1, wherein uplink data is transmitted via at least a first HARQ process without transmitting padding during at least a second HARQ process in which no data is available for transmission;
receiving a transmission of the uplink data from the wireless device according to the SPS configuration; and
transmitting an indication to the wireless device via a control channel, the indication indicating to transmit new uplink data to the network node, the indication transmitted in response to receiving the transmission of the uplink data from the wireless device.

17. The method of claim 16, further comprising stopping transmission of indications on a Physical Hybrid-ARQ Indicator Channel (PHICH) to the wireless device.

18. The method of claim 16, further comprising receiving, in response to the transmission of the indication sent on the control channel, new uplink data from the wireless device.

19. The method of claim 18, wherein the new uplink data is buffered hybrid automatic repeat request (HARQ) data prioritized over non-buffered data available to the wireless device for transmission.

20. The method of claim 16, wherein the SPS configuration comprises a periodicity of one transmission time interval (TTI).

21. The method of claim 16, wherein transmitting the indication on the control channel comprises addressing the indication to a semi-persistent scheduling-cell radio network temporary identifier (SPS-CRNTI) associated with the wireless device.

22. The method of claim 16, wherein transmitting the indication on the control channel comprises indicating to the wireless device to transmit the uplink data using unlicensed radio resources.

23. The method of claim 16, further comprising:
receiving a retransmission of the uplink data from the wireless device after transmitting the indication that the wireless device is to transmit new uplink data to the network node; and
retransmitting the indication on the control channel to the wireless device to transmit new uplink data to the network node.

24. The method of claim 16, further comprising:
transmitting a Radio Resource Control (RRC) reconfiguration message to the wireless device; and
transmitting ACK and/or NACK indications on a PHICH.

25. The method of claim 16, wherein the control channel comprises a Physical Downlink Control Channel (PDCCH).

26. A wireless device comprising storage operable to store instructions and processing circuitry operable to execute the instructions, whereby the wireless device is operable to:
transmit uplink data to a network node, the uplink data transmitted according to a semi-persistent scheduling (SPS) configuration obtained from the network node wherein SPS configuration specifies a number of hybrid automatic repeat request (HARQ) processes, the number greater than 1, wherein uplink data is transmitted via at least a first HARQ process without transmitting padding during at least a second HARQ process in which no data is available for transmission; and
retransmit the uplink data to the network node until receiving an indication to transmit new uplink data, the indication received from the network node via a control channel.

27. The wireless device of claim 26, whereby the wireless device is further operable to receive the SPS configuration from the network node prior to transmitting the uplink data.

28. The wireless device of claim 26, whereby the wireless device is further operable to transmit the new uplink data to the network node in response to receiving the indication from the network node via the control channel.

29. The wireless device of claim 28, whereby the wireless device is further operable to prioritize transmission of buffered hybrid automatic repeat request HARQ) data as the new uplink data.

30. The wireless device of claim 26, whereby the wireless device is further operable to ignore indications from the network node on a Physical Hybrid-ARQ Indicator Channel (PHICH).

31. The wireless device of claim 26, wherein the indication to transmit the new uplink data comprises a grant of uplink resources received from the network node on the control channel.

32. The wireless device of claim 31, wherein the grant of uplink resources is addressed to a semi-persistent scheduling-cell radio network temporary identifier (SPS-CRNTI) associated with the wireless device.

33. The wireless device of claim 26, wherein the SPS configuration comprises a periodicity of one transmission time interval (TTI).

34. The wireless device of claim 26, wherein the wireless device is operable to transmit the uplink data using unlicensed radio resources.

35. The wireless device of claim 26, wherein the wireless device is operable to transmit the uplink data according to a time division duplex configuration.

36. The wireless device of claim 26, whereby the wireless device is further operable to receive a message from the network node indicating to fallback to a negative acknowledgement (NACK) procedure for performing retransmissions.

37. The wireless device of claim 36, wherein the NACK procedure comprises transmitting padding when no data is available for transmission.

38. The wireless device of claim 36, wherein the NACK procedure comprises monitoring a Physical Hybrid-ARQ Indicator Channel (PHICH) for NACK messages and wherein the message from the network node indicating to fallback to the NACK procedure comprises a Radio Resource Control (RRC) reconfiguration message.

39. The wireless device of claim 26, whereby the wireless device is further operable to stop retransmitting the uplink data after transmitting a maximum number of retransmissions.

40. The wireless device of claim 26, wherein the control channel comprises a Physical Downlink Control Channel (PDCCH).

41. A network node comprising storage operable to store instructions and a processor operable to execute the instructions, whereby the network node is operable to:
configure a wireless device to transmit according to a semi-persistent scheduling (SPS) configuration wherein the SPS configuration specifies a number of hybrid automatic repeat request (HARQ) processes, the number greater than 1, wherein uplink data is transmitted via at least a first HARQ process without transmitting padding during at least a second HARQ process in which no data is available for transmission;
receive a transmission of the uplink data from the wireless device according to the SPS configuration; and
transmit an indication to the wireless device via a control channel, the indication indicating to transmit new uplink data to the network node, the indication transmitted in response to receiving the transmission of the uplink data from the wireless device.

42. The network node of claim 41, whereby the network node is further operable to stop transmission of indications on a Physical Hybrid-ARQ Indicator Channel (PHICH) to the wireless device.

43. The network node of claim 41, whereby the network node is further operable to receive, in response to the transmission of the indication sent on the control channel, new uplink data from the wireless device.

44. The network node of claim 43, wherein the new uplink data is buffered hybrid automatic repeat request (HARQ) data prioritized over non-buffered data available to the wireless device for transmission.

45. The network node of claim 41, wherein the SPS configuration comprises a periodicity of one transmission time interval (TTI).

46. The network node of claim 41, wherein the network node is operable to address the indication to a semi-persistent scheduling-cell radio network temporary identifier (SPS-CRNTI) associated with the wireless device.

47. The network node of claim 41, wherein the network node operable to transmit the indication on the control channel comprises the network node operable to indicate to the wireless device to transmit the uplink data using unlicensed radio resources.

48. The network node of claim 41, whereby the network node is further operable to:
receive a retransmission of the uplink data from the wireless device after transmitting the indication that the wireless device is to transmit new uplink data to the network node; and
retransmit the indication on the control channel to the wireless device to transmit new uplink data to the network node.

49. The network node of claim 41, whereby the network node is further operable to:
transmit a Radio Resource Control (RRC) reconfiguration message to the wireless device; and
transmit ACK and/or NACK indications on a PHICH.

50. The network node of claim 41, wherein the control channel comprises a Physical Downlink Control Channel (PDCCH).

* * * * *